United States Patent [19]

Takada

[11] 4,118,772
[45] Oct. 3, 1978

[54] DIGITAL CONTROLLER SYSTEM

[75] Inventor: Keisuke Takada, Hinoshi, Japan

[73] Assignee: Tokyo Shibaura Electric Co., Ltd., Japan

[21] Appl. No.: 695,563

[22] Filed: Jun. 14, 1976

[30] Foreign Application Priority Data

Jun. 16, 1975 [JP] Japan .................................. 50-72025

[51] Int. Cl.² .................. G05B 13/00; G06B 15/00
[52] U.S. Cl. ................................ 364/119; 235/303.4;
364/200; 364/115
[58] Field of Search ............... 235/150.5, 151.1, 150.1;
340/172.5; 445/1; 318/591; 364/101, 115, 114,
119, 120, 200

[56] References Cited

U.S. PATENT DOCUMENTS

| 3,377,623 | 4/1968 | Reut et al. | 340/172.5 |
|---|---|---|---|
| 3,512,131 | 5/1970 | Nelson et al. | 340/172.5 |
| 3,540,001 | 11/1970 | Gormley et al. | 235/150.1 |
| 3,582,621 | 6/1971 | Lawler | 235/150.1 |
| 3,636,331 | 1/1972 | Amrehn | 235/150.1 |
| 3,984,665 | 10/1976 | Shriver et al. | 235/150.5 |

OTHER PUBLICATIONS

Wherry, T. C. et al; "Direct Digital Control"; Chemical Engineering Progress; vol. 64, No. 4, Apr. 1968; pp. 33-38.
Uram, R; "Bumpless Transfer Under Digital Control"; Control Engineering, Mar. 1971; pp. 59-60.
Morley et al; "The Ferranti System and Experience with Direct Digital Control"; IEEE Convention Record; #3, 1965.

Primary Examiner—Malcolm A. Morrison
Assistant Examiner—Errol A. Krass
Attorney, Agent, or Firm—Oblon, Fisher, Spivak, McClelland & Maier

[57] ABSTRACT

A digital controller system for controlling the flow of a plurality of processes, each of the processes being provided with a process detector and an actuator, the digital controller system comprising: a digital bus for transmitting digital signals from one location to another; an analog bus for transmitting analog signals from one location to another; a plurality of direct digital loop stations, each of said direct digital loop station adapted to be connected to a process detector and an actuator of a process for receiving analog signals characterizing the state of the process from the process detector and transmitting the analog signals onto the analog bus and for receiving digital signals controlling the flow of the process from the digital bus and transmitting corresponding analog signals to the operating apparatus; and a central processor unit for transmitting the digital signals controlling the flow of the process to the digital bus, and for receiving the analog signals characterizing the state of the process from the analog bus, the central processor unit including a digital computer, an analog-to-digital converter and a data transmission unit.

4 Claims, 3 Drawing Figures

DIGITAL CONTROLLER SYSTEM

BACKGROUND OF THE INVENTION

1. Field of the Invention

The present invention relates to a direct digital control system and more particularly to an improved digital controller system permitting both a sweeping reduction in wiring and the addition of new control loops without the addition of the process input-output devices required in conventional digit controller system.

2. Description of the Prior Art

Generally, in a well known DDC (Direct Digital Controller) system connected to a plurality of control systems, a variable measured value to be controlled is transmitted from a detector of each of the control systems and is compared with a preset reference value by the digital computer. A control signal generated as a result of a control operation by the computer is sent back to an operating apparatus of the control system and the control system reduces the error or the deviation between the measured value and the reference value to zero by driving the apparatus.

Analog signals from the detectors of the control systems are applied to the digital computer through a first multiplexer and an analog-to-digital converter. Digital signals from the computer are applied to the operating apparatus through a second multiplexer and digital-to-analog converters.

In the digital controller system there are back-up devices to back-up the digital computer upon occurrence of faults in the computer. The analog controller is generally employed as the backup device in the important control loop. These back-up devices are connected to the digital-to-analog converter, the detector and the operating apparatus, and are provided in the same numbers as the control systems. Switches of the first and second multiplexer and the analog-to-digital and digital-to-analog converters as the process input-output devices of the digital computer are required corresponding to the number of control systems. Moreover, in the conventional DDC system, wirings between the computer and the back-up device, for enabling both the computer and the back-up device to have the coincident set point variable, the communication wiring for displaying on whether the control is by the back-up device or by the computer and wirings for monitoring the adjustment output of the back-up device, etc. are required. Furthermore, in the conventional system, wirings for monitoring the process input variable and manipulated output variable and for the abnormal alarm must be connected to the respective display means separately and the system becomes much more complicated.

However, this digital controller system has the following defects or problems. More particularly, because back-up devices are required corresponding in number with control systems, wirings among the back-up devices, a central processor unit and control system become very complex. Another problem is that the numbers of process input-output devices increase correspondingly with the control systems. In addition, there arise problems such as the enlarged input-output section of each device and the complicated wiring job in the centralized control, as the result of the complication of wirings. And the problem of the weakened aggregation of the control system is also raised.

The present invention contemplates a new and improved computer system which eliminates all of the above preferred problems.

SUMMARY OF THE INVENTION

Accordingly, it is an object of the present invention to provide a new and improved digital controller system capable of simplifying wirings.

Another object of the invention is to provide a new and improved digital controller system capable of increasing the control systems controlled by the digital controller system without attaching any additional process input-output devices.

Yet another object of the invention is to provide a digital controller system permitting the aggregation of the respective functions with a decreased number of auxiliary instruments.

A further object of the invention is to provide a digital controller system permitting the risk distribution which comes from the division of the control system into many components with each central processor unit taking charge of the control function of the component to enable the division of work.

A still further object of the invention is to provide a digital controlled system permitting the back-up of a plurality of central controlled units by one central controlled unit.

A yet further specific object of the invention is to provide a digital control system permitting any easy realization of the computer hierarchy, with the broad expandability from the control system of the small loop to the centralized monitor control system.

Briefly, in accordance with one aspect of the present invention, these objects are attained by the provision of a digital controller system for controlling the flow of a plurality of processes, each of the processes being provided with a process detector and an actuator, the digital controller system comprising: a digital bus for transmitting digital signals from one location to another; an analog bus for transmitting analog signals from one location to another; a plurality of direct digital loop stations, each of said direct digital loop stations adapted to be connected to a process detector and an actuator of a process for receiving analog signals characterizing the state of the process from the process detector and transmitting the analog signals onto the analog bus and for receiving digital signals controlling the flow of the process from the digital bus and transmitting corresponding analog signals to the actuator; and central processor means for transmitting the digital signals controlling the flow of the process to said digital bus, and for receiving the analog signals characterizing the state of the process from said analog bus, said central processor means having an input and an output and including a digital computer having an input and an output, an analog-to-digital converter connected between the input of said central processor means and the input of said digital computer and a data transmission unit connected between the output of said digital computer and the output of said central processor means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENT

Figure 1:
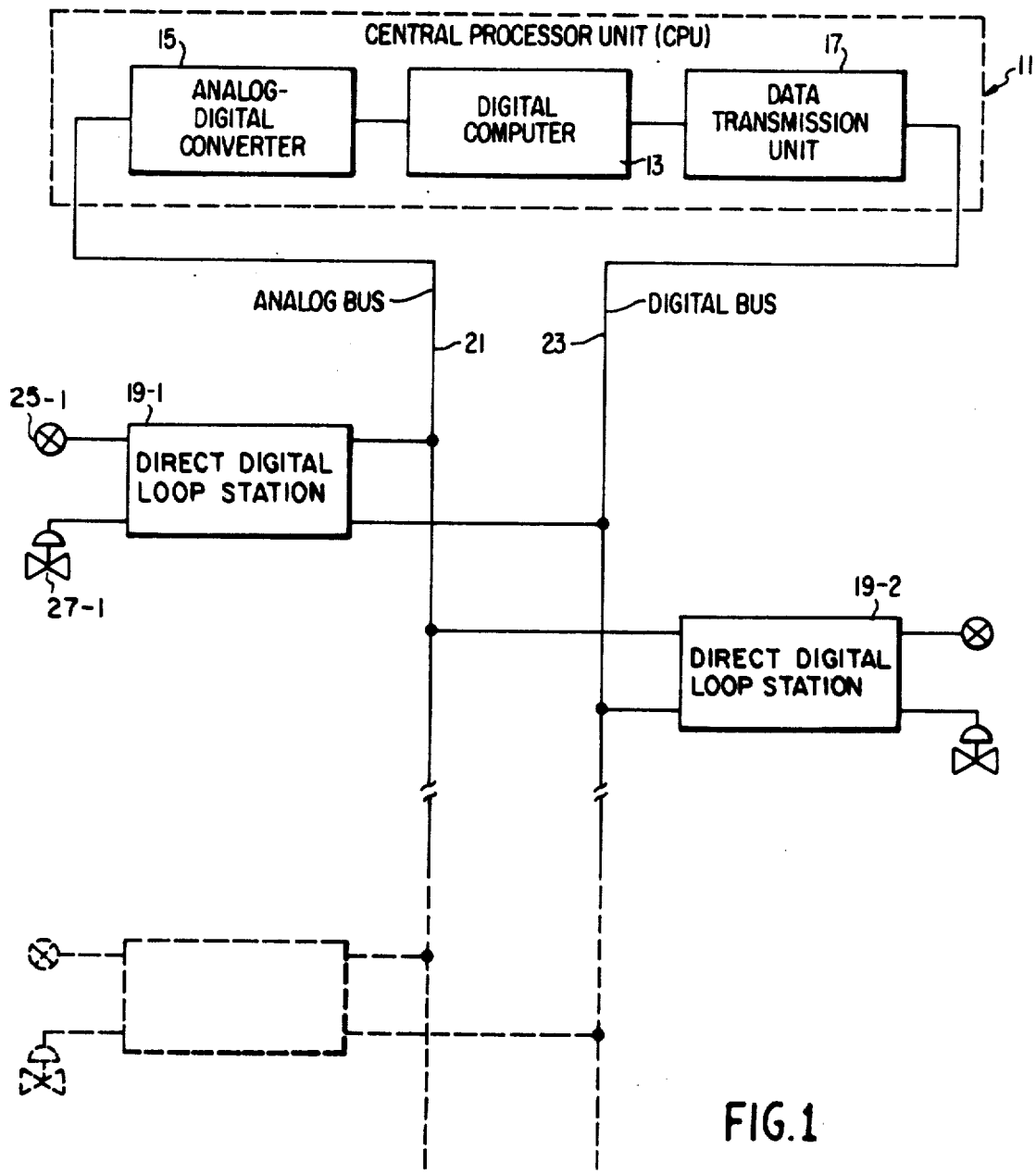
FIG. 1 shows a block diagram of a preferred embodiment of a digital controller system in accordance with the present invention.

Referring now to FIG. 1, it should be understood that the digital controller system of the present invention includes a central processor unit 11, a plurality of direct digital loop stations 19, an analog bus 21 connected between the direct digital loop stations and the central processor unit for transmitting analog signals, and a digital bus 23 connected between the central processor unit and the direct digital loop stations for transmitting digital signals. The central processor unit 11 includes a digital computer 13 to perform control operations, an analog-to-digital converter 15 whose input is connected to the analog bus for receiving an analog signal, and which converts the analog signal to a digital signal and outputs the converted digital signal to the digital computer 13, and a data transmission unit 17 whose input is connected to the digital computer for receiving a digital signal, and whose output is connected to the digital bus 23 for transmitting digital signals from the digital computer 13 to the direct digital loop stations 19. The control operations perform the required computing operations in relation to the set point variable. The analog signal is the process variable being output from the detector of the process as will be described below.

The direct digital loop stations 19 are provided at each control loop and are connected to the analog bus 21 and the digital bus 23, to control processes in accordance with a control signal from the digital computer 13 and to monitor the state of the processes. Therefore, the analog signal from the detector, or the process variable, is displayed at the direct digital loop station 19. Since the direct digital loop stations are provided with an automatic-manual control switch, they can also function under manual control. The direct digital loop station 19 convert a digital signal outputted from the data transmission unit 17 on the digital bus 23 to an analog signal, and supply the analog signal to the processes. This analog signal is the manipulated variable to the actuator and is also displayed at the direct digital loop station. The direct digital loop stations further output an analog signal on the analog bus 21 to the central processor unit 11 from a process sensor selected in accordance with a command of the digital computer 13.

When a flow operation is performed in the digital controller system, the direct digital loop station 19-1 connected to a flow meter is selected by a command of the digital computer 13 produced in the digital computer 13 and transmitted through the data transmission unit 17 and the digital bus 23. The direct digital loop station 19-1 transmits an analog signal received from a process detector 25-1 and which indicates the amount of flow to the A/D converter 15 of the central processor unit 11 through the analog bus 21. The A/D converter 15 converts the signal from analog to digital and applies it to the digital computer 13. The digital computer 13 of the central processor unit 11 decides whether to open or close a valve that adjusts the flow of the process. In other words, the digital computer 13 performs the required computing operation comparing the process variable with the set point variable and outputs the control signal, or the manipulated variable in the digital signal. A control signal is transmitted to the direct digital loop station 19-1 through the data transmission unit 17 and the digital bus 23, and is converted to an analog signal in the direct digital loop station 19-1. The analog signal is applied to an actuator 27-1 of the valve and adjusts the opening or closing of the valve. In other words, this analog signal is applied to the actuator of the process as the manipulated variable. Accordingly, a flow value as a process value accords with a reference value. This reference value is the reference for controlling the process input signal and is the set point variable. This set point variable can be input from the direct digital loop station and the process is controlled with reference to this value by the control signal. In addition, the set point variable is displayed at the direct digital loop station. Next the direct digital loop station 19-2 is selected by the command of the digital computer 13. An analog signal similarly is supplied by the direct digital loop station to the A/D converter 15 through the analog bus 21 and is converted by the A/D converter to a digital signal which is supplied to the digital computer 13. A control signal generated as a result of a control operation at the digital computer 13 adjusts the opening or closing of a second valve.

Thus the analog bus 21 and the digital bus 23 are used for signal transmission between the central processor unit 11 and the direct digital loop stations 19. Because the analog bus 21 and the digital bus 23 are connected to the central processor unit, and the direct digital loop stations 19 are connected to the two buses 21, 23, the wiring in the digital controller system becomes very simple, and new direct digital loop stations for adding on a new control loop can be provided in the digital controller system by connection to the two buses 21, 23 without attaching any additional process input-output devices as is required in the conventional digital controller system.

Figure 2:
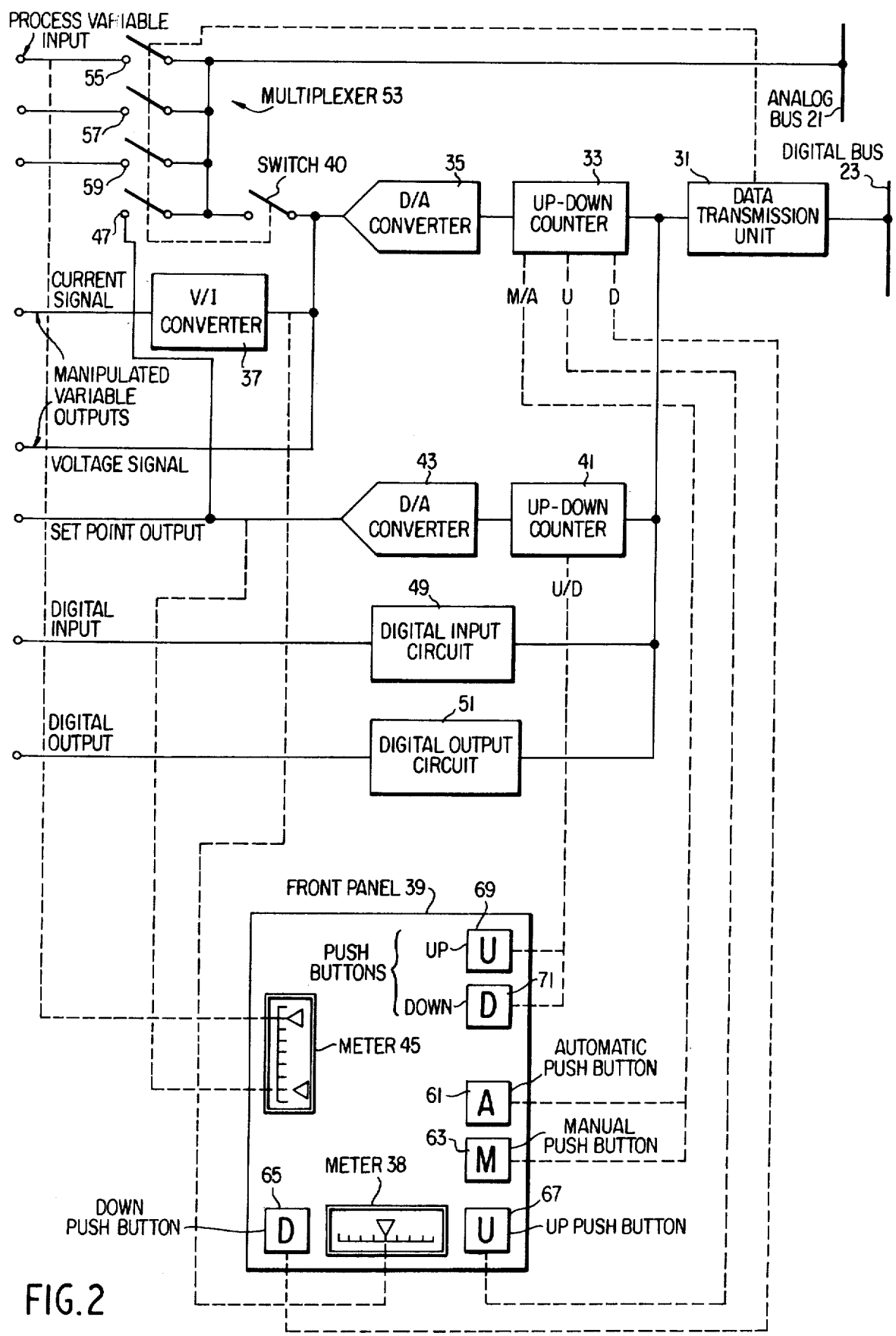
FIG. 2 is a block diagram for a direct digital loop station used in the present invention as shown in FIG. 1.

FIG. 2 shows a detailed block diagram of the direct digital loop stations shown in FIG. 1. Referring now to FIG. 2 of the drawing, one embodiment of the present invention will be described in more detail. The direct digital loop station 19 has a data transmission unit 31 which is connected to the digital bus 23 and receives a digital command signal from the digital computer 13 via the data transmission unit 17 of the central processor unit 11. The first up-down counter 33 is connected to the data transmission unit 31, and also is connected to the first digital analog converter 35. The result of a control operation in the central processor unit 11 is transmitted through the digital bus 23 the data transmission unit 31, and the first up-down counter 33 and converted to an analog signal by the first D/A converter 35 and outputted directly to the process or through V/I converter 37 which converts voltage to electric current. This analog signal is the manipulated variable and is applied to the actuator of the process. Since two types of actuators are used, one operated by the voltage signal and the other by the current signal, the manipulated variable output is designed so that both the current signal and the voltage signal can be output. The selection will be made in accordance with the kind of the actuator. The analog signal produces an indication on a first meter 38 in a front panel 39. The first up-down counter can switch to automatic or manual operation and has an up-down function. The first D/A converter 35 is connected to the analog bus 21 through a first switch 40 that is provided for monitoring of the output of the first D/A converter 35 by the central processor unit 11 or supplying a converted analog signal when the operation is exchanged from manual to automatic in the first up-down counter 33. A second up-down counter 41 is connected to the data transmission unit 31 and connected to a second D/A converter 43. The set point variable read-out from the central processor unit 11 produces an indication on a second meter 45 after being converted to an analog signal by the second D/A converter 43 and the second up-down counter 41. The set-point variable can be reset by an up-down operation in the second up-down counter. The second D/A converter 43 is connected through the second switch 47 to the analog bus 21 for transmitting the new preset value to the central processor unit 11. A digital input circuit 49 and a digital output circuit 51 that are connected to the data transmission unit 31 are used in the sequence control, interlock, alarm, start of control and so on. The digital input is used for controlling by receiving the digital signal input from the other devices. For instance, it is used for communication transfer between DDLS's, and for controlling its own loop by receiving the digital input for the set point variable of other DDLS's and monitoring them. In addition, the start and stop signals from the other devices are input. In other words, the well known "sequence control" is attained. The digital input is used when the alarm output is used for the other display device or when its own set point variable is output to other DDLS, etc. A multiplexer 53 is provided within the direct digital loop station 19 for signal selector operation. And a plurality of switches, for example, three switches 55, 57, 59 are provided within the multiplexer 53. The process variable from the detector of the process from the process detector is applied to the switch 55 and produces an indication at the second meter 45 on the front panel 39. Also auxiliary inputs are prepared for compensation such as temperature or pressure-temperature and are supplied to the switches 57, 59. Also all outputs of the switches 55, 57, 59 are connected to the analog bus 21.

In the automatic mode in which the first up-down counter is set for automatic operation by pushing the automatic push button 61 provided on the front panel for transfer between the automatic and manual modes, the command of the central processor unit 11 is sent to the digital bus 23 from the data transmission unit 17 of the central processor unit 11 and is received at the data transmission unit 31 of the direct digital loop station. The data transmission unit 31 closes the switch 55 of the multiplexer 53 in accordance with the command of the central processor unit 11. An analog signal from the process detector is transmitted to the central processor unit 11 through the analog bus 21 and produces an indication on the second meter 45 on the front panel. Also the switch 57 and/or the switch 59 for auxiliary inputs is closed by a signal from the data transmission unit 31 for compensation such as temperature or pressure-temperature in accordance with the command of the central processor unit 11. The auxiliary inputs are transmitted to the central processor unit 11 through the analog bus 21. A control signal generated as a result of the control operation in the central processor unit 11 is transmitted to the digital bus 23 and is received at the data transmission unit 31 of the direct digital loop station, and is applied to the operating terminal after being converted to an analog signal by the first D/A converter 35 and the first up-down counter 33. The preset reference value in the central processor unit 11 is read-out and produces an indication on the second meter 45 after being converted to an analog signal by the second D/A converter 43 and the second up-down converter 41. When the operator wants to alter the preset value (set point value), he pushes the buttons 69; 71; then the clock pulse (not shown in the drawing) is applied to the up-down counter 41 making that counter 41 add or subtract between two quantities of the previous set point variable and the clock pulse variable values to obtain the new set value and then the new set value will be output. This output is made analog by conversion in the converter 43 to be applied to the central processor unit 11 via the switch 47 and analog bus line. On the other hand, that new set value is indicated on the meter 45.

The manual mode is provided to back up the function of the central processor unit 11 when the unit 11 fails. The manual control is always required when the process is to be started, except when the unit 11 fails. Manual operation is initiated by pushing the manual push button 63 provided on the front panel 39 for transfer between the automatic and manual modes. In the case that the direct digital loop station 19 performs the back-up function, an operator watches the indications of the second meter 45 indicating the analog signal from the process detector and the preset value, and changes the output of the first D/A converter 35, indicated on the first meter, by pushing an up-button 67 or a down-button 65 on the front panel for up or down counting by the first up-down counter 33. Thus the operator can adjust the output of the first D/A converter 35 to afford a value between a process value from the process detector and the preset value. Also the preset value can be set by pushing the up-button 69 or down-button 71 on the front panel for up or down counting by the second up-down counter.

Accordingly, new control loops are added by connecting the direct digital loop stations to the analog bus and digital bus. Further, the output supplied to the actuator of the process is directly produced in the first D/A converter and capacitance-hold drift is eliminated.

Figure 3:
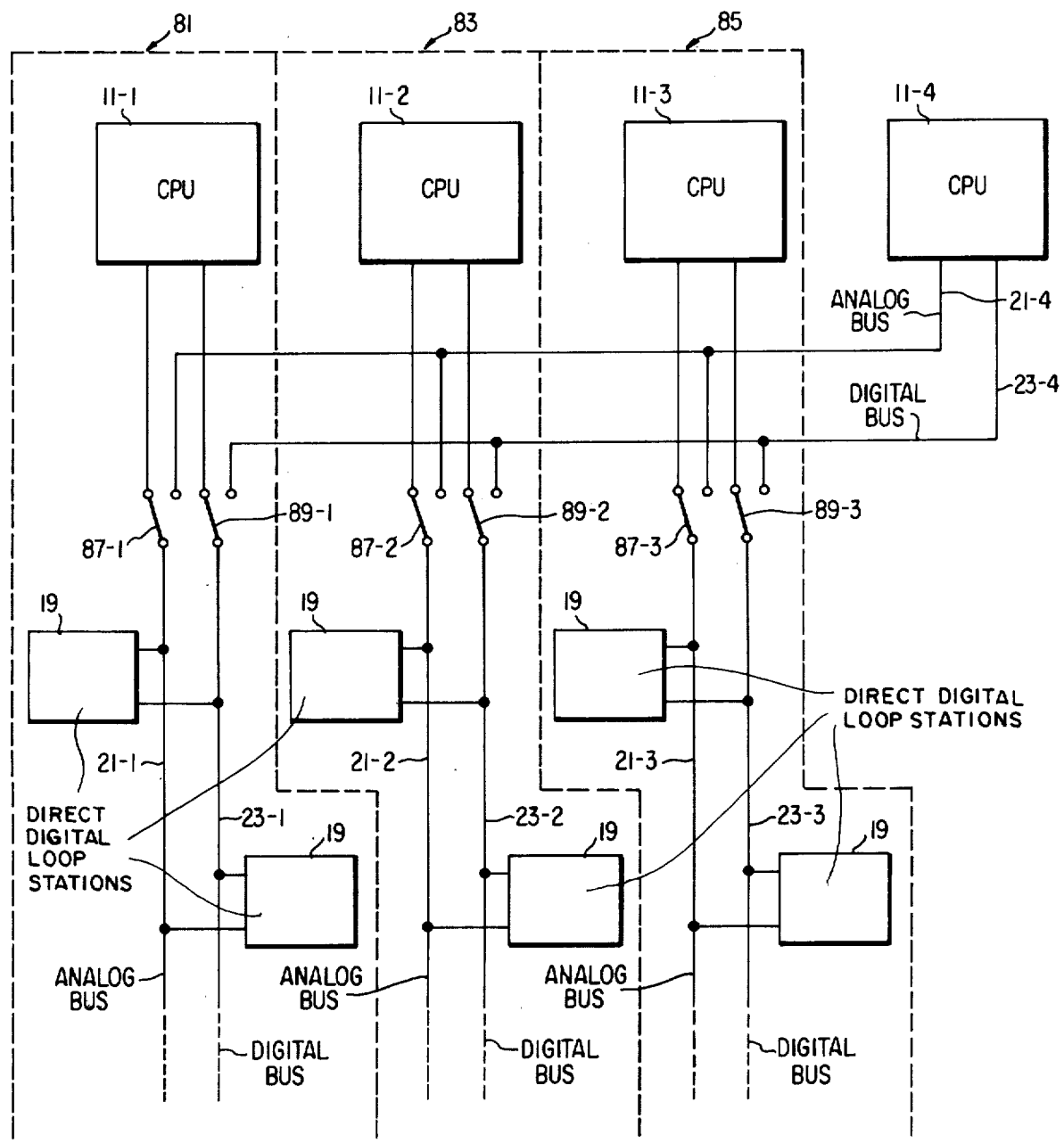
FIG. 3 is a block diagram of another embodiment of a digital controller system in the present invention.

FIG. 3 shows another embodiment of the present invention. In this embodiment, a plurality of the digital controller systems 81, 83, 85 shown in FIG. 1 and one central processor unit 11-4 to back up the function in the central processor unit in a digital controller system are provided. Analog buses 21-1, 21-2, 21-3 and digital buses 23-1, 23-2, 23-3 connected to the central processor unit 11-1, 11-2, 11-3 respectively can be diverted to an analog bus 21-4 and a digital bus 23-4 connected to the central processor unit 11-4 by switches 87-1, 89-1, 87-2, 89-2, 87-3, 89-3. Thus, for example, the central processor unit 11-4 can be used instead of the central processor unit 11-2 when the unit 11-2 fails by throwing switches 87-2 and 89-2.

Accordingly, when one of the central processor unit fails a ready central processor unit can back it up by switching the analog bus and the digital bus. The switching circuit to back-up the function of the central processor unit is very simple.

Obviously numerous modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A digital controller system for controlling the process variables of a plurality of processes comprising:
   a plurality of detectors, each detector for detecting the values of the process variables of a corresponding one of the plurality of processes;
   a plurality of actuators, each actuator for adjusting the values of the process variables of a corresponding one of the plurality of processes;
   a digital bus for transmitting digital signals from one location to another;
   an analog bus for transmitting analog signals from one location to another;
   a plurality of direct digital loop station means, each of said direct digital loop station means for respectively receiving from one of said plurality of detectors analog information signals representative of the values of the process variables of one of the plurality of processes and for transmitting the analog information signals onto said analog bus, for receiving from said digital bus digital control signals to adjust the values of the process variables of the one of the plurality of processes and for transmitting corresponding analog control signals to one of said plurality of actuators to adjust the values of the process variables of the one of the plurality of processes, each said direct digital loop station means further comprising a manual control mode of operation for transmitting operator generated analog control signals to the one of said plurality of actuators to adjust the values of the process variables of the one of the plurality of processes, and including means for setting set point variables for comparison with the values of the process variables when each said direct digital loop station means is operated in the manual control mode of operation; and
   first central processor means for transmitting the digital control signals to said digital bus and for receiving the analog information signals from said analog bus, said first central processor means having an input and an output and including a first digital computer having an input and an output, a first analog-to-digital converter connected between the input of said first central processor means and the input of said digital computer, and a first data transmission means connected between the output of said digital computer and the output of said first central processor means,
   whereby the function of the first central processor means is backed up by each of said direct digital loop station means by operating said direct digital loop station means in the manual control mode in the event said first central processor means fails.

2. The digital controller system recited in claim 1 wherein each of said direct digital loop stations includes:
   second data transmission means having an input and an output, the input of said second data transmission means connected to said digital bus for receiving the digital control signals;
   an up-down counter having an input and an output, the input of said counter connected to the output of said second data transmission means;
   a digital-to-analog converter having an input and an output, the input of said digital-to-analog converter connected to the output of said counter, and the output of said digital-to-analog converter connected to the one of said plurality of actuators;
   multiplexer means operatively connected to said second data transmission means and responsive thereto for selecting and applying to said analog bus one analog signal from among several inputs including the analog information signals from the one of said plurality of detectors.

3. The digital controller system recited in claim 1 including:
   second central processor means for transmitting the digital control signals to said digital bus and for receiving the analog information signals from said analog bus, said second central processor means having an input and an output and including a second digital computer, a second analog-to-digital converter connected between the input of said second central processor means and the input of said digital computer and second data transmission means connected between the output of said digital computer and the output of said second central processor means; and
   switch means connected on one side thereof to said first and said second central processor means and connected on the other side thereof to said digital bus and said analog bus for disconnecting one and connecting the other of said first and second central processor means from and to said digital bus and said analog bus in the event of failure of the one of said first and second central processor means.

4. The digital controller system recited in claim 1 wherein:
   each direct digital loop station means includes means for displaying the values of the set point variables and the values of the process variables.

* * * * *